Patented Aug. 8, 1939

2,168,523

UNITED STATES PATENT OFFICE 2,168,523

PROCESS FOR TREATING SEEDS, BULBS, TUBERS, AND ROOTS

George Edward Heyl, Mill Hill, London, England

No Drawing. Application February 26, 1938, Serial No. 192,889. In Great Britain July 2, 1936

4 Claims. (Cl. 47—58)

This invention relates to the treatment of seeds, bulbs, tubers and roots and more particularly the seeds, bulbs, tubers and roots of the floriferous type and has for its object to provide an improved method of treating these and a coating medium for use therein which is adapted to impart colour or colour and smell to the flowers produced therefrom or to effect a change in colour and smell of the flowers produced from the said seeds, bulbs, tubers and roots.

In the specification accompanying British Letters Patent No. 448,849 granted to me there is described a method of treating seeds, bulbs and tubers consisting in applying thereto a coating of preserved latex containing one or more than one fertiliser, to which a fungicide may be added if desired, the object being to assist the growth of the plant from the seeds, bulbs, tubers or roots under treatment and to protect the plant against disease and attack by insect life and bacteria. That is to say the specification of the aforesaid patent relates firstly to the addition of fertiliser by means of a coating containing the fertiliser to the seeds, bulbs, tubers or roots under treatment in order to obviate the necessity of using stable and other manures; and secondly it deals with the protection of plants against insect life and bacteria by incorporating fungicides, insecticides and the like in the coating medium by which the seeds, bulbs, tubers or roots are treated.

According to the present invention a method of treating seeds, bulbs, tubers and roots consists in applying one or more than one coating of preserved latex or synthetic rubber containing an organic dye which is noninjurious to plant life in order to alter the colour of the flowers produced therefrom. The method further consists in applying one or more than one coating of preserved latex or synthetic rubber containing an organic dye and an organic compound both of which are noninjurious to plant life, the said coating being applied to the seeds, bulbs, tubers and roots in order to alter the colour and perfume of the flowers produced therefrom. A coating medium for use in treating seeds, bulbs, tubers and roots of plants is provided comprising preserved rubber latex or synthetic rubber having incorporated therein an organic dye or an organic dye and an organic compound both of which are noninjurious to plant life the organic dye and the latex or the organic dye and the organic compound incorporated in the latex being applied as a coating to the seeds, bulbs, tubers and roots in order to impart a colour to white flowers or to effect a change in colour as regards coloured flowers or to affect the colour and perfume of the said flowers. The organic dye may be tartrazine or violet R. S. (Coomassie) or other suitable or desired organic dye and the organic compound which produces or alters the perfume may be ionone or a member of the terpene series or other suitable or desired organic compound. The preserved latex which forms the basis of the coating medium may be considered as forming a carrier for the added organic dye or for the added organic dye and the added organic compound the smell or perfume changing compound being incorporated with the organic dye in the preserved latex or incorporated separately in preserved latex and applied therewith as a second coating after the first coating which is intended to affect the colour or vice versa. The latex carrier may be rubber latex (*Hevea brasiliensis*) gutta percha or guayule or other latex or synthetic rubber. For example, the carrier or basis of the coating medium may be an aqueous dispersion of rubber natural or synthetic of any desired concentration or an artificially prepared aqueous dispersion of rubber natural or synthetic.

It will be readily appreciated that it is of great importance to guard against putrefaction of the latex and the term preserved latex as used in this specification means latex to which sufficient preservative medium has been added to prevent, for all practical purposes, the latex going bad. It may be mentioned that the coating medium should be made up preferably from dilute latex which may be prevented from putrefying by the addition of a suitable alkali, for example, an alkali re-acting salt, such as sodium or potassium di-phosphate. The use of dilute latex is of some little importance due to the fact that if a too concentrated latex is used the coating forms a somewhat thick skin around the seed or the like which is apt to retard the germination and growth.

In order to grow coloured flowers or plants or to change the normal colour of flowers or plants, a dye of an organic nature selectively chosen for the purpose is incorporated directly in the preserved latex or the coating of synthetic rubber which is applied to the seeds, bulbs, tubers or roots when desired. Further, the colour may be obtained or changed by applying two or more successive coatings at different periods in the growth of the plant. For instance, one coating containing at least one organic dye may be applied to the roots of a plant, the plant being then allowed to grow for a period of time, in order to allow the substance to pass into the sap thereof. Subsequently, a further coating may be applied to the roots of the plant, this further coating containing a different organic dye.

As an example of a coating medium in accordance with the present invention the following treatment of a rose tree is given:

The roots of a Lady Sackville rose tree were treated with a coating medium consisting of preserved rubber latex containing 14% solid matter to which 18 drops of the terpene ionone (per 100 grammes of the carrier) had been added. It may be mentioned that three drops is about the equivalent of one gramme. After this coating had dried, the roots were then treated a second time with a coating medium consisting of preserved rubber latex containing 14% solid matter to which 1½ grammes tartrazine N. S. (yellow) had been added. The rose tree was treated in the month of November and after the coating had dried subsequent to the second treatment the rose tree was planted in a pot and kept in a warm atmosphere. The rose tree flowered and produced blooms having a Gloire de Dijon colour and a strong scent. It may be mentioned that an untreated Lady Sackville rose tree planted at the same time produced white blooms having practically no perfume.

As another example of treating a Lady Sackville rose tree the following treatment may be carried out.

The roots of the rose tree may be dipped in a coating medium consisting of preserved rubber latex containing 14% solid matter to which six drops of ionone (per 100 grammes of the carrier) have been added. After the drying out of the first coating, the roots may be again dipped in a coating medium of the same carrier to which 1 gramme violet R. S. (Coomassie) per 100 grammes of carrier) has been added.

It should be clearly understood that one coating containing a dye may be applied to the seeds, bulbs, tubers or roots in order to produce or change the colour of the flowers and that a second coating containing an organic compound which will either impart a perfume or smell to the flowers or change the smell of the flowers produced therefrom may be subsequently applied to the seeds, bulbs, tubers or roots.

In some cases the coating entirely disappears in a relatively short space of time and it would appear that part of the coating medium passes into the seeds, bulbs, tubers or roots, the other part passing into the surrounding soil. In other cases the basic part of the coating medium, that is the latex or rubber part thereof may remain behind as a skeleton after the die substance as well as the substance which alters the colour and smell respectively of the flowers or imparts a smell thereto has passed into the sap of the plant.

It is obvious from the foregoing that one coating or two or more coatings may be applied to seeds, bulbs, tubers or roots, one coating medium containing an organic dye and the second coating or a subsequent coating containing an organic compound which will alter the smell of the flowers or impart a smell thereto. In the example given the treatment of the Lady Sackville rose may for example be separated into two parts. The first coating with the coating medium may be applied for the purpose of altering the colour of the rose or the first coating medium may be applied to impart a perfume or smell to the rose or both actions may be effected on the rose or other tree in one coating.

The use of the term seeds in the appended claims is intended to indicate seeds, bulbs, tubers and roots and is to be so understood.

What I claim is:

1. A method of treating seeds, consisting in applying more than one coating of preserved latex containing an organic dye and an organic compound to alter the color and smell of the flowers produced therefrom.

2. A method of treating seeds, consisting in applying thereto more than one coating of a coating medium comprising synthetic rubber having incorporated therein tartrazine in order to alter the colour of the flowers produced therefrom.

3. A method of treating seeds, of plants consisting in applying thereto a coating of a coating medium comprising preserved rubber latex having incorporated therein ionone and tartrazine in order to alter the smell and colour of the flowers produced from the seeds, bulbs, tubers or roots.

4. A coating medium for use in treating seeds, comprising preserved synthetic rubber having incorporated therein ionone and tartrazine in order to alter the smell and colour of the flowers of plants to which the coating may be applied.

GEORGE EDWARD HEYL.